United States Patent
Jacobs et al.

(10) Patent No.: US 8,237,985 B2
(45) Date of Patent: Aug. 7, 2012

(54) SOFTPROOFING VIA MODELING PRINT ENGINE RENDERING CHARACTERISTICS

(75) Inventors: William S. Jacobs, Los Angeles, CA (US); David C. Robinson, Penfield, NY (US); Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1468 days.

(21) Appl. No.: 11/756,081

(22) Filed: May 31, 2007

(65) Prior Publication Data

US 2008/0297814 A1 Dec. 4, 2008

(51) Int. Cl.
G06F 15/00 (2006.01)
(52) U.S. Cl. ......... 358/1.9; 358/1.1; 358/1.15; 358/1.13
(58) Field of Classification Search .................... 358/1.1, 358/1.9, 1.15, 1.13
See application file for complete search history.

(56) References Cited

U.S. PATENT DOCUMENTS

| | | | |
|---|---|---|---|
| 6,757,071 B1 * | 6/2004 | Goodman et al. | 358/1.13 |
| 6,798,530 B1 * | 9/2004 | Buckley et al. | 358/1.13 |
| 6,961,140 B2 | 11/2005 | Moore et al. | |
| 6,963,413 B2 | 11/2005 | Rahgozar et al. | |
| 2005/0036171 A1 * | 2/2005 | Bala et al. | 358/2.1 |
| 2005/0075813 A1 * | 4/2005 | Shen | 702/85 |
| 2006/0215219 A1 * | 9/2006 | Yorimoto et al. | 358/1.15 |
| 2007/0195361 A1 * | 8/2007 | Tomomatsu | 358/1.15 |

* cited by examiner

*Primary Examiner* — King Poon
*Assistant Examiner* — Iriana Cruz
(74) *Attorney, Agent, or Firm* — Oliff & Berridge, PLC

(57) ABSTRACT

A softproofing system and method render an input document for display on a monitor to faithfully represent projected output from a target print engine, where the displayed document representation rendering is modeled to include internal print engine specific enhancements or characteristics of the target print engine. The system and method identify the target print engine and print engine specific rendering characteristics from the specified content, such as an input file, which may be a raster image or an electronic file in a PDL format. Specific print engine characteristics may include halftone screen identification, error diffusion identification, halftone dot shape, write white, write black, anti-aliasing, line width compensation and specific tone reproduction curves.

18 Claims, 4 Drawing Sheets

SOFTPROOFING VIA MODELING PRINT ENGINE RENDERING CHARACTERISTICS

BACKGROUND

The disclosure is directed to softproofing, i.e., reviewing an electronic representation of an image prior to printing, copying, or otherwise producing the image on a media, such as a sheet of paper. In particular, exemplary embodiments of the disclosure identify specific internal rendering characteristics of a target printer and model the electronic representation for display on a monitor so as to faithfully represent the appearance of a resultant hardcopy printout, for example, of a document on a printer.

An important part of many digital print workflows is customer softproofing, which provides a preview display on the customer's display monitor of a projected hardcopy printer output from a target print engine. However, for softproofing to be beneficial, there must be an accurate representation of the ultimate printed results. Generally, softproofing begins with an electronic file containing one or more objects representing one or more pages of print data, which is converted to be displayed on an image display device, such as a monitor. Customers can learn how the electronic file will look without actually printing out the document. Thus, softproofing can save customers from unnecessarily using resources such as toner and paper.

The electronic file can be obtained from several sources, for example: i) capturing by a scanning device; ii) outputting from a print controller decomposition service; iii) importing from another application program, or iv) generating by an application program, such as Microsoft Word, Adobe Acrobat, or Microsoft PowerPoint.

The softproofing may begin with an image in a raster image format. The raster images represent image data as a sequence of pixels using a single bit or multiple bits per pixel. Image files may also be contained in, for example, TIFF files or in page description language (PDL) files such as, for example, Adobe Portable Document Format (PDF) files. Using various lossless compression algorithms, the binary image files, for example, may be relatively small, but able to support high image quality. Print controllers may process such raster images at rates of hundreds of pages per minute. For these reasons, raster images are widely used throughout the printing industry.

A raster image is created by assembling multiple scan lines across the page. Each scan line is represented by numerous pixels or dots. Raster images can be device independent or device dependent. On the one hand, device dependent images are targeted to a specific image output device, such as a specific print engine. On the other hand, device independent images are not targeted to a specific image output device.

Present monochrome raster image path architectures commonly represent print jobs in terms of pages of device dependent binary raster images, typically formatted as TIFF 6.0 CCITT Group IV images. Scanners initially capture each page as a device independent grayscale image having multiple bits per pixel and then immediately convert the result into a device dependent binary raster image (one bit per pixel) targeted for output on a specific print engine. Because the characteristics of each print engine vary, so too will the device dependent binary raster images targeted for them. Such characteristics can include whether the print engine writes white or black, minimal permissible line width, a specific tone reproduction curve (TRC), one or more available halftone screens, halftone dot patterns, and the use of error diffusion to minimize Moiré effects to best render a raster image for a particular print engine. In a process known as segmentation, following scanning, images are analyzed into different regions, each of which can be rendered so as to print optimally on the intended target print engine.

Current softproofing programs are based on raster images, but the programs are limited in usefulness as they only provide a reasonable representation of what an electronic file will look like when printed. Existing softproofing programs either do not try to accurately represent all aspects of objects as they would actually appear when rendered by a specific target print engine or are incapable of such representation. Instead, existing softproofing programs are ordinarily intended for representing features like the layout of the document, imposition arrangements, or appropriate color rendering. For example, Microsoft Word's print preview feature focuses on providing printed page layout information, but does not accurately portray exactly how the document itself will look printed from the printer. Similarly, softproofing applications such as Integrated Color Solutions' Remote Director, ORIS' Soft Proof, Kodak Matchprint Virtual Proofing (formerly KPG Matchprint), EFI's Fiery Graphic Arts Package, and the like focus on certain color rendering modifications for the softproofing, but do not address various print engine specific rendering characteristic adjustments.

SUMMARY

The above conventional softproofing programs, while providing limited viewable representations of print images on a monitor, can have a diminished fidelity and accuracy when viewed from the on-monitor representation.

For example, advantages of binary raster images during printing can cause difficulties when viewed in softproofing application. Because an on-screen image uses multiple bits per pixel, the binary raster images must be converted to grayscale. Simplistic straightforward conversion is usually performed by softproofing systems in which each output pixel is directly set to a maximum or minimum value. However, this straightforward conversion generally yields noticeable substandard results even though most current softproofing programs already allow limited tone reproduction curve adjustments to comprehend basic characteristics of the monitor and output print engine. This may include, for example, conversion from a typical printer color space such as CYMK to a typical monitor color space such as RGB. However, current softproofing applications do not address or compensate for print engine specific rendering techniques or characteristics typically included as hardware or software on the target print engine.

Thus, although the target print engine is able to enhance or otherwise modify the presented image data through device specific internal rendering to achieve a high quality print, the impact of such print engine specific rendering characteristics are not taken into account by conventional softproofers. That is, current softproofing processes and systems are limited in their ability to accurately represent certain features of a print job because the target print engine performs several internal processes and operations on incoming print jobs to ensure acceptable print quality and these operations are not considered in the conversion models used by current softproofers. Among these print engine specific characteristics are halftone screening, error diffusion to eliminate Moiré, and minimum line width compensation. Because current softproofing solutions do not take into account these internal image quality processing characteristics specific to a particular print engine, the on-screen results are sub-optimal. The accuracy especially suffers in high zoom scenarios where the programs can provide noticeably inaccurate representations of the final print results.

Thus, the image viewed on the monitor after the typical softproofing process can look significantly different from the resulting print output, which performs the various print engine specific rendering characteristics. For example, if an originally thin line is below the target print engine's specific minimum thickness characteristic, the print engine may thicken the line during processing. Alternatively, during the printer rendering, an original raster may have a non-uniform appearance that can be corrected through proper application of a suitable halftone screen or error diffusion procedure. If these internal print engine specific characteristics are not taken into account, the on-screen representation of the image to be printed will not faithfully represent what actually would be printed. Accordingly, the full benefit of softproofing cannot be realized.

There is a need for an improved softproofing system and method that can generate superior monitor representations of print job images to be printed by a target print engine. The superior monitor representation should more faithfully represent the print output of the document by comprehending and taking into account the print engine's specific rendering characteristics. In exemplary embodiments, this is achieved by a softproofing method and system that identifies a target print engine, identifies print engine specific rendering characteristics, and models the electronic file to be printed based on the print engine specific rendering characteristics so that it more faithfully mimics the appearance of the resultant printed documents on a display monitor. In certain aspects, the identification and modeling can be achieved by the softproofing system comprehending the way in which a print engine specific binary raster image is initially generated, similar to reverse engineering.

In accordance with certain aspects, the modeled print engine specific characteristics may include one or more printer enhancements selected from the group consisting of halftone screen identification, error diffusion identification, halftone dot shape, write white/write black, anti-aliasing, line width compensation, and the like.

In accordance with certain aspects of the methods and systems of the disclosure, a device dependent binary raster image is received and from that image's tag information the image's target print engine is determined. From this determination and known or determinable rendering characteristics particular to that specific print engine, the softproofing system attempts to determine (e.g., reverse engineer) what changes were made to the initial captured image to render the device dependent binary raster image. From this, the system models the changes to convert the image to an image that is then used for on-screen viewing on a monitor.

Oftentimes, an input image file is in a PDL language that includes several objects, each representing text strings, line art, graphics, photos, etc. to be printed on one or more pages of output. Each individual object may be printed with different internal print engine specific rendering characteristics, depending on the object type, etc. Accordingly, in certain exemplary embodiments, rendering and modeling can be iteratively performed on an object-by-object basis. This will preserve the object integrity and type for the modeling. In other exemplary embodiments, the various objects can be rendered and modeled collectively at one time. However, when rendered as a batch, the resultant raster image data loses potentially useful modeling information, such as object type, which could provide a more specific rendering model that takes into account print engine specific characteristics for specific object types.

An advantage of exemplary embodiments is the accounting for the internal print engine specific characteristics on the displayed image. This accounting will provide a more faithful reproduction during the on-monitor viewing. Accordingly, because the representation is more realistic, this may save resources by not having to view the actual hardcopy image to assess image quality or other appearance characteristics.

DETAILED DESCRIPTION OF EMBODIMENTS

The disclosure is directed to methods and systems of softproofing an electronic input file, such as a PDL formatted document or raster image, intended to be printed on a target print engine. The softproofing methods and systems process the input file (such as by raster image processing) to identify the specific target print engine and model print engine specific rendering characteristics so that the image displayed on a monitor more faithfully represents the print output of the document on the target print engine. Softproofing involves the viewing of an electronic file on a monitor display device 50 (shown in FIG. 1), such as a CRT, LCD, or plasma computer monitor or screen as it would appear in printed form from the target print engine.

Figure 1:
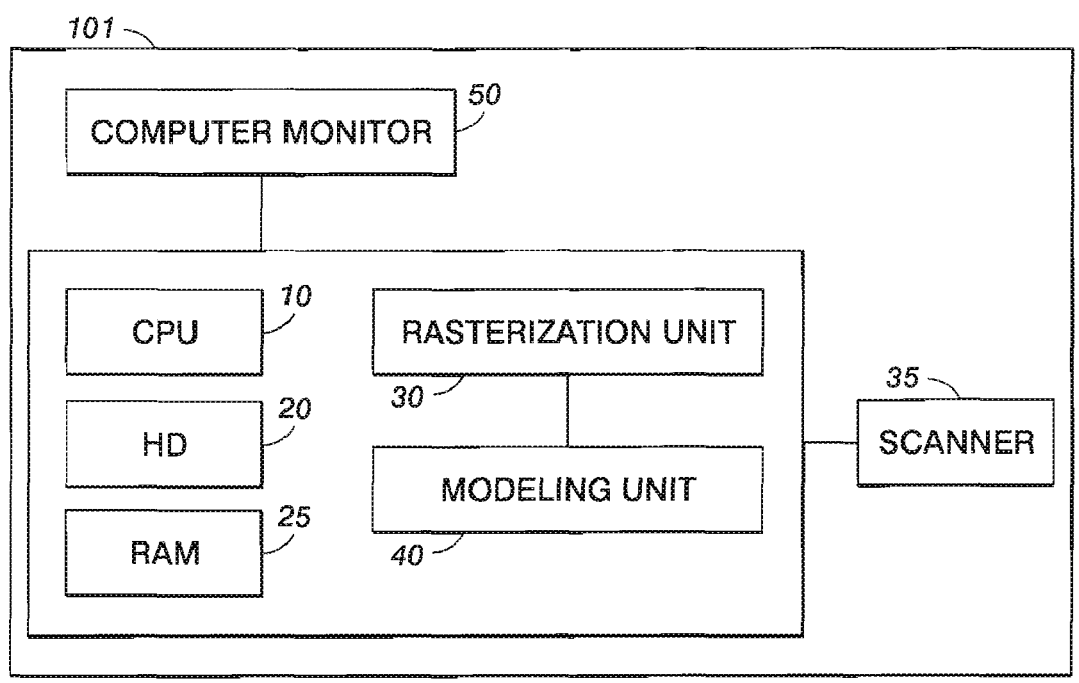
FIG. 1 schematically represents a device for softproofing a document to include internal print engine specific enhancements or characteristics on a display monitor that faithfully represents the projected print output by a specific target print engine.

FIG. 1 shows a system 101 for softproofing an electronic input file representing a print job or document, such as a PDL language file or raster image intended to be printed on a specific target print engine (unshown). System 101 may include a CPU 10, a hard drive 20, a RAM 25, a scanner 35 serving as an image input device for scanning a hardcopy original to generate the electronic input file, a rasterization unit 30, a modeling unit 40, and a softproofing monitor 50. However, the electronic input file can be provided by other sources, such as being generated by an external application or system and stored in hard drive 20 or RAM 25. Alternatively, a suitable application program embodied in software provided in hard drive 20 and controlled by CPU 10 may be used to generate the electronic input file.

In exemplary embodiments, the electronic input file may have been generated as a device independent file, but has been designated for printing by a target print engine (unshown) and rasterized to be device dependent, including embedded formatting or data that can be analyzed to assess and identify a target print engine and any print engine specific rendering characteristics that may be applied during the printing.

The rasterization unit 30 comprehends the input electronic file, such as a PDL document file or raster image, for a target print engine, by processing of the input electronic file. In exemplary embodiments, this is achieved by raster image processing (RIP) of the file. As part of the processing, which can occur on a page-by-page or object-by-object basis, the rasterization unit 30 can comprehend or identify the target print engine and any print engine specific rendering characteristics that may be performed on the input file during eventual processing by the target print engine. In certain embodiments, this can include processing of the input file from a device dependent binary raster image into a device independent grayscale image when the input file contains monochrome information, followed by conversion of the grayscale image back to a device dependent binary raster image. However, when the input file contains highlight color or full color image information (including photographs), rasterization unit 30 may process the image into multiple image planes, such as black and highlight color image planes for highlight color image data or four color planes for full color CYMK image data. Moreover, when the input file is in the form of a PDL page description that includes several objects, each of which can take various forms (line art, textual, graphics, etc.), rasterization unit 30 may separately render the objects as an iterative process, or may collectively process the objects on a page-by-page basis.

Modeling unit 40 in exemplary embodiments models, for example, the binary raster image into a grayscale image suitable for display on monitor 50 or by applying the target print engine specific rendering characteristics to the image. In other embodiments, the modeling unit 40 may receive a highlight color or full color image and convert the file to an intermediate image that is suitable for display on monitor 50. This modeling may also include any necessary machine specific TRC adjustment for the display. For example, a monitor representation may be in RGB colorspace that differs from the typical CYMK colorspace of many print engines and require suitable conversion. Thus, the modeling unit 40 models the converted image to reflect identified internal print engine specific enhancement capabilities/characteristics of the target print engine and applies such identified characteristics in the conversion process. Monitor 50 then displays the modeled image to more faithfully represent the appearance of the input file as it would appear if printed by the target print engine, including mimicking of internal print engine specific characteristic enhancements. Although internal print engine specific characteristics may vary by device, they can include, for example, halftone screen identification, error diffusion identification, halftone dot shape, write white/write black, anti-aliasing, line width compensation, specific tone reproduction curves (TRCs), etc. as non-limiting examples.

Error diffusion applies a dithering algorithm that converts gray information to a representation of gray via binary pixels. The algorithm achieves dithering by diffusing the quantization error (above or below a pre-defined threshold) of a pixel to its neighboring pixels, according to the distribution, Error diffusion identification helps avoid disagreeable Moiré patterns by introducing noise into the problem areas.

Halftoning is the transformation of a grayscale or color image to a pattern of small spots with a limited number of colors. For example, monochrome printing, in order to make an image printable, utilizes just black spots on white background. Printing is in its bare essence a binary process for each point on the paper. The paper is either covered, for example, black, or uncovered, for example, white. For example, the halftone process creates a particular (binary) pattern of small black dots on a white background. When viewed from a sufficient distance, the human viewer will be unable to see the dots themselves, because they are too small. Instead, the human viewer will have the illusion of gray, whose darkness will depend on the proportion or amount of black dots on the white background. For example, more or large black dots will create the illusion of a darker gray, while fewer or small black dots will create the illusion of a lighter gray.

Thresholding is the transformation of a grayscale image to an image composed of binary pixels. The algorithm compares grayscale values to a pre-defined threshold. For example, above a threshold the pixel is converted to a black pixel and below the same threshold, the pixel is converted to a white pixel.

Line width adjustments concern modifications to a line's width to ensure that it is properly printed. When printed, a single pixel wide line may print as a discontinuous line segment. To ensure that the entire line is printed as a single continuous piece, a target print engine may have a spatial characteristic that internally increases the printed line width to a certain minimum line width to ensure the integrity and continuity of a printed line.

Anti-aliasing is a technique used to prevent visually objectionable artifacts known as 'jaggies' or 'staircasing.' A sloping edge may not appear to be smooth but rough. To prevent this, intermediate pixels are displayed via intermediate values. When the resulting line is viewed, the human eye blends all of the pixels together so that it appears to have a smooth edge.

The width of a single pixel vertical line may be substantially different than the width of a single pixel horizontal line. This asymmetric response is typically a characteristic of marking technologies such as xerography. To ensure uniform printed widths of vertical and horizontal lines with common width specifications, the print engine internally may widen or thin either the vertical or horizontal line.

Tone Reproduction Curves (TRCs) map electronic image gray levels to a new set of electronic gray level to enable the desired tonal reproduction (gray level) response on the image output device such as, for example, a printer. The TRC mapping can be used to correct for brightness, saturation, highlight and shadow detail, contrast, and density range mismatches between the electronic image and the printed output. Different print engines may have different TRCs. The described exemplary internal print engine specific characteristics are intended to be illustrative and non-limiting. Alternative embodiments can accommodate additional known or subsequently developed printer enhancement characteristics.

As shown in FIG. 1, the softproofing system 101 is preferably implemented on a programmed general purpose computer. However, the softproofing system 101 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device which can implement a finite state machine capable of implementing the flowcharts shown in FIGS. 2-4 can be used to implement the system 101.

Figure 2:
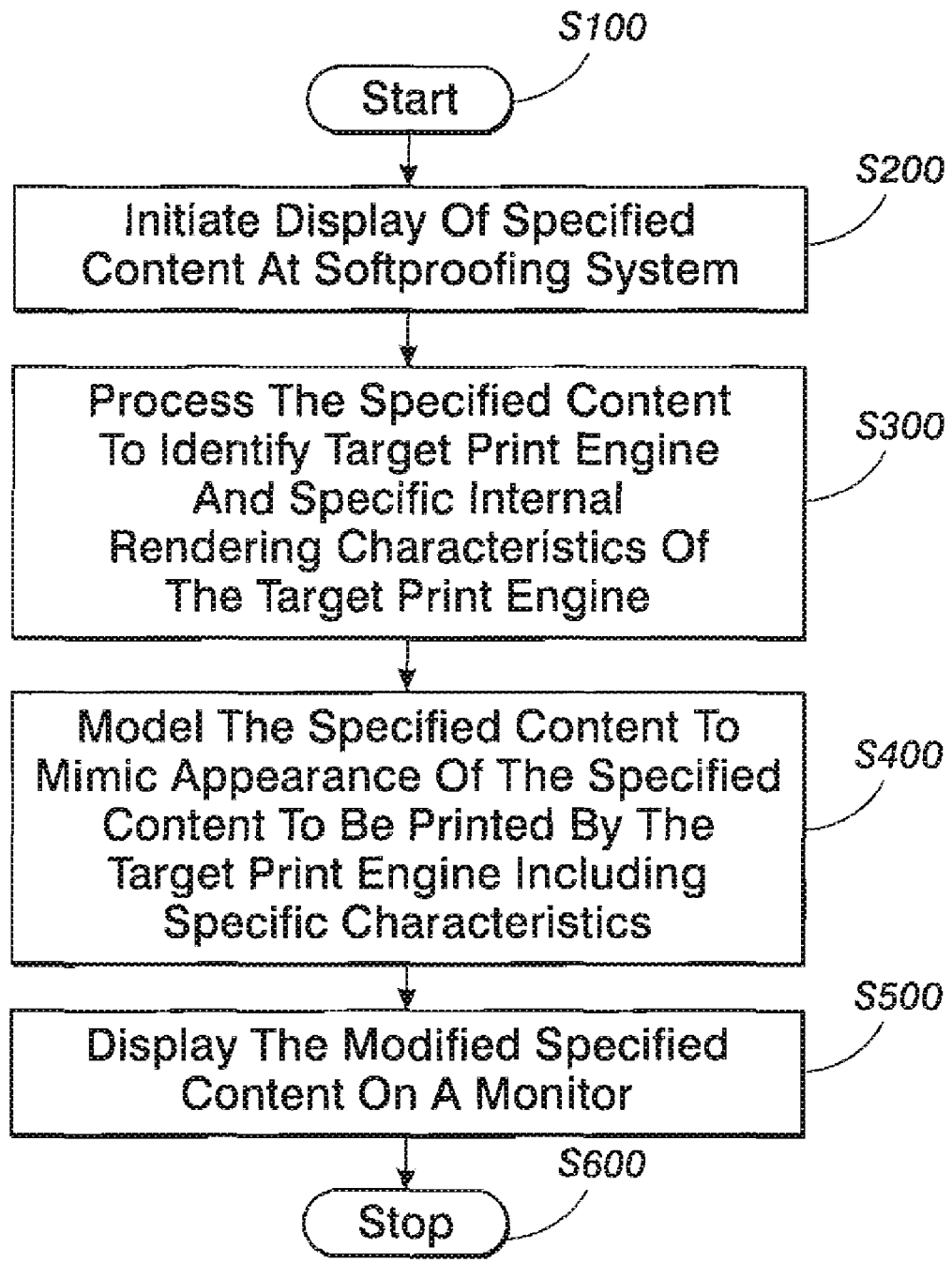
FIG. 2 discloses a flowchart for softproofing a document to include internal printer engine enhancements on a computer monitor to faithfully represent the projected print output.

In this regard, FIG. 2 depicts an exemplary embodiment of a method for softproofing an input document file, such as a PDL language document or raster image, on a viewing monitor in which the softproofing system identifies a target print engine, identifies print engine specific rendering characteristics, and models the electronic file so that it more faithfully mimics the appearance of the resultant printed document file on a display monitor to include internal print engine characteristics intended to enhance the printing by the target print engine.

The method starts at step S100 and advances to step S200 where content to be displayed is specified at the softproofing system such as, for example, an input file is received. In exemplary embodiments, the input file may be a device dependent binary raster image, but may also be a multiple plane raster image when the input includes highlight color, full color, or photographic images. Alternatively, the input file may be in the form of a PDL file, TIFF, or the like.

From step S200, flow advances to step S300 where the specified content is processed by the softproofing system. This is typically achieved by raster image processing (RIPping) of the input file. During the RIP process, the softproofing system determines the image's current target print engine. For example, this can be achieved by accompanying tag information provided in the device dependent image data or, when such tags are absent, may be deduced by analysis of the binary raster image data itself. In another preferable example, this can be achieved by assessing the presence of print engine specific characteristics, such as halftone screening, line width, type of error diffusion, halftone dot shape, inherent TRCs, write white/write black, etc., all of which can be used to assess and identify the target print engine.

Once the target print engine is identified, and/or associated print engine specific rendering characteristics are identified, the process advances to step S400 where the softproofing system attempts to determine what changes were applied to the initial captured image to render the raster image. The softproofing system then attempts to model these changes and converts the raster image to a form that allows representation in a monitor, while taking into account these characteristics to enable display of a faithful reproduction of the image on monitor 50 as it would have appeared if the image were reproduced on the target print engine.

From step S400, flow advances to step S500 where the modeled image is displayed on monitor 50. The process ends at step S600.

In the case of a binary raster input file, such as from a monochrome print engine, the raster image may be converted from a device dependent binary raster image into a grayscale image. However, if the input file is for a highlight or contone print engine that has been RIPped and rendered to the target print engine, a multiple plane raster image corresponding to the printed page may be generated, with each plane corresponding to one of the target print engine's toners or ink. Later, as each of the separate planes of the page image is submitted to the print engine, special internal print engine specific rendering characteristics are invoked. As in the case of generating binary raster images from grayscale raster images, these characteristics perform functions such as halftone screening, Moiré elimination, and minimum line width compensation. The softproofing system can similarly reverse and take out the processing that occurs on each plane of the raster image.

Processing may act differently on each image plane. For example, in the case of certain highlight print engines, the black and highlight color images are processed differently. For example, a minimum line width algorithm compensation algorithm could be applied to the black image, but not be applied to the highlight color image. Accurate display on the monitor takes into account this different rendering and processes the image for display on the monitor 50 accordingly.

Figure 3:
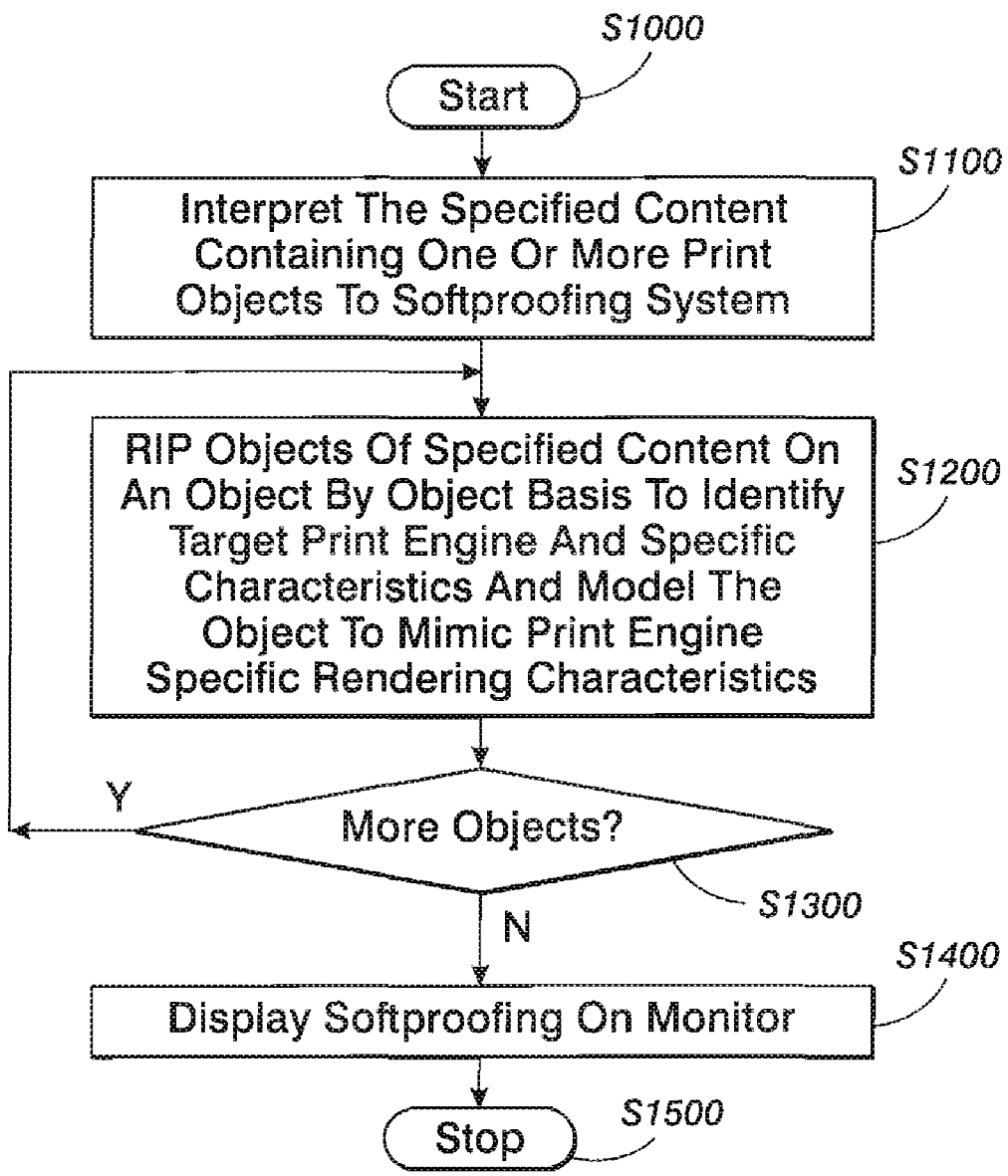
FIG. 3 discloses a flowchart of a second embodiment for softproofing an input file on an object-by-object basis.

An exemplary embodiment will be described with reference to FIG. 3. The process starts at step S1000 and advances to S1100 where an input file is submitted to the softproofing system. In this exemplary embodiment, the input file is a PDL language document containing at least one, and preferably multiple print objects. Each object can be of varying types, including line art, text, graphics, photographs, etc.

From step S1110), flow advances to step S1200 where the input file is raster image processed (RIPped) on an object-by-object basis. As in the FIG. 2 embodiment, during the processing, the target print engine and target print engine specific characteristics are identified. Each rendered object is then modeled to a form that will be displayed on the monitor to mimic the print engine specific rendering characteristics. Once modeled, flow advances to decision step S1300 where is it determined whether any further objects require rendering. If so, flow advances back to step S1200. If not, flow advances to step S1400 where the rendered and modeled image (consisting of at least one object) is displayed on the softproofing system monitor 50. The process stops at step S1500. Note that in this embodiment, rendering and modeling can occur during the same processing and can be performed on individual objects. Thus, because each object type may include different print engine specific characteristics, these will not be lost, as may occur if multiple objects of different types were rendered simultaneously into one raster image and then modeled. For example, in the case of an object containing highlight printing, highlight color images may not be subjected to the minimum line width algorithm that the target print engine performs on black images. Other differences dependent on object type could also be determined and appropriately removed from the device dependent raster image and accounted for in the modeling to a form for viewing on the monitor that faithfully conforms to the image that would have been printed by the target print engine.

Figure 4:
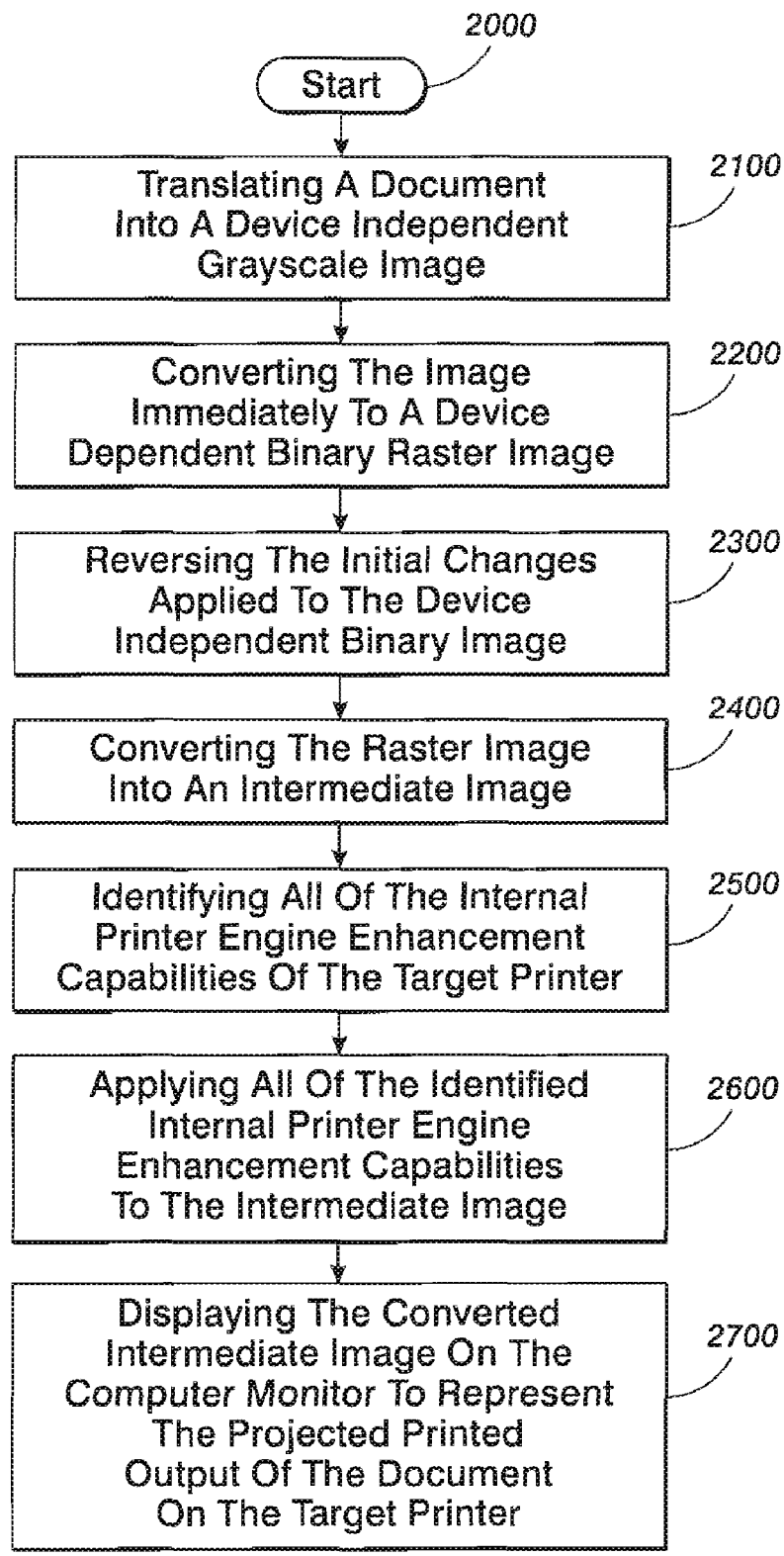
FIG. 4 discloses a flowchart of another embodiment for softproofing an input file.

An alternative embodiment will be described with reference to FIG. 4. The process begins with S2000, the start step, and advances to step S2100. Beginning with an electronic file on the computer that will undergo softproofing, the file is sent to a raster image processor or a digital front-end that contains a raster image processor as shown at S2100. The electronic file may be converted into a bitmap representation.

When a file is scanned into the system, as shown at S2100, a device independent grayscale image data is retrieved directly from the image input device or scanner and stored on the computer.

However, by the processes of segmentation, thresholding, and/or error diffusion, the scanned image, at S2200, is immediately converted into a device dependent binary raster image optimized for a selected print engine. During the segmentation process, image data is analyzed and separated into different regions. Each of the regions is rendered to be part of a binary raster image so as to print optimally on the targeted print engine. Segmentation is followed by the use of lossless compression algorithms. Lossless compression signifies that when input data is compressed and later decompressed, the decompressed output data is completely identical to the pre-compression input data. The resulting files are relatively small. Thus, when printed on the target device, the devices can support high image quality at high print speeds.

The binary raster image is typically a monochrome image commonly represented as a device dependent binary raster image. For example, the image may be in such file formats as, for example, TIFF 6.0 CCITT Group IV, JPEG, PDF, or EPS (encapsulated PostScript). However, any image file format may be used. Generally, the device dependent binary raster image is initially captured by a scanner as a device independent grayscale image with multiple bits per pixel. The image is converted immediately into a device dependent binary raster image with one bit per pixel targeted for output on a specific print engine as explained above by the segmentation process as shown at S2200. The method reverses the process converting the device dependent binary raster image to a device independent grayscale image.

Internally, print engines perform many different enhancements such as whether the engine writes white or writes black, the minimal permissible line width, different tone reproduction curves, the availability of particular half-tone screens, halftone dot patterns, and the use of error diffusion to minimize Moiré all affect how best to render a raster image on a particular printer when creating the device dependent binary raster image.

Once the machine-specific processing becomes known, the method, in S2300, will attempt to generate the device independent grayscale image by attempting to "back out" all of the processing applied to the device dependent binary raster image. For example, limited tone reproduction curve adjustments, line width adjustments, and corner sharpening may be made.

Corner sharpening concerns both exterior and interior corners, which have a tendency to round to a radius rather than preserve a sharp intersection. To ensure that the corners appear sharp when printed, the engine internally removes pixels from the nexus of interior corners and adds pixels to the nexus of exterior corners.

The method first tries to remove any optimization applied to the inputted device dependent binary raster image to account for the specific internal print engine or any other specific printer engines that can be identified. Appropriate machine-specific tone reproduction curve adjustments are additionally performed in some embodiments. The additional tone reproduction curve adjustments will result in a grayscale image more faithfully representing the final print output. In other words, the method tries to recreate the original device independent grayscale image as shown in S2300.

The method then proceeds to S2400, whereby the binary image is converted into a grayscale image. The grayscale image may represent each pixel by multiple bits.

The method then proceeds to S2500, whereby the target print engine capabilities may be identified. The target print engine may be a monochrome printer, highlight color printer or color printer. A monochrome printer may print in black and white printer. A highlight color printer may print in two colors, a highlight color and black. A color printer may print in cyan, magenta, yellow, and black (CMYK). The identifying process step locates all of the internal printer engine enhancement features contained in the target image output device and determines which features will be applied to the image itself.

From step S2500, flow advances to step S2600, which involves applying all the identified internal print engine features possessed by the target printer or image output device to the grayscale image to model the image to faithfully reproduce the image with print engine specific rendering characteristics.

Finally, S2700 involves displaying the converted grayscale image on a monitor to faithfully represent the original image on the target print engine. The result is much more accurate softproofing of the original image because internal print engine enhancements will be represented on the image as best as possible. In an exemplary embodiment, no conversion to a device dependent binary raster image is necessary because a computer screen can natively display a device independent grayscale image. In an exemplary embodiment, if a PDL was used with at least one object, the at least one object may be reassembled to form a single grayscale image to be displayed. For multiple grayscale files representing different colors, each file may be represented by a different mask possessing a different color. The masks may be recombined before being displayed in a single file.

The modeling or rendering may include converting the image from a printer specific color space, such as CMYK color space, to a monitor color space, such as RGB, if color is contained in the image. There are numerous known methods that can achieve such conversion from the CYMK color space to the RGB color space.

The specified content may contain, for example, any one of image, PDL or job ticket. The specified content may contain multiple files consisting of any combination of images, PDLs, and job tickets. Although, the identification of the target printer may be based on the content being printed, it may have nothing to do with the content being printed. For example, the target printer may be identified by examining the instructions for printing the specified content.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for softproofing to faithfully represent target print engine output on a display, the method comprising:
    initiating an image display request at a softproofing system of a specified content in an input file;
    interpreting the specified content to identify a target print engine from a plurality of print engines and print engine specific rendering characteristics for the identified target print engine;
    modeling an image to a form viewable on a display, by taking into account the identified target print engine specific rendering characteristics; and
    displaying the modeled image on the display to faithfully represent printed output from the target print engine including the identified target print engine specific rendering characteristics, wherein
    the identified target print engine specific characteristics include halftone screen identification, error diffusion identification, halftone dot shape, anti-aliasing, and line width compensation.

2. The method according to claim 1, wherein the modeling includes rasterizing at least one device dependent object of an input file into a grayscale image, the at least one device dependent object including any one of monochrome, grayscale, highlight color, or full color.

3. The method according to claim 2, wherein the rasterizing determines what changes were made to an original captured image by the identified target print engine specific rendering characteristics and backs out made changes.

4. The method according to claim 1, wherein the interpreting identifies the target print engine from a tag in the input file.

5. The method according to claim 1, wherein the input file is a raster image.

6. The method according to claim 1, wherein the input file is in a page description language format.

7. The method according to claim 6, wherein the modeling is performed on an object-by-object basis.

8. The method according to claim 1, wherein the target print engine includes any one of a monochrome printer, a highlight color printer, and a color printer.

9. A softproofing device for faithfully representing an image intended to be output on a target print engine on a display, the softproofing device comprising:
    a softproofing rendering unit that receives an input file representing the image intended to be printed by the target print engine and renders the input file, including identification of the target print engine from a plurality of print engines and identification of print engine specific rendering characteristics for the identified target print engine;

a modeling unit that models the image into a form that can be displayed on a display that takes into account the identified target print engine specific rendering characteristics; and a monitor that displays the modeled image to faithfully represent printed output from the target print engine including the identified target print engine specific characteristics, wherein the identified target print engine specific characteristics include halftone screen identification, error diffusion identification, halftone dot shape, anti-aliasing, and line width compensation.

10. The softproofing device according to claim 9, wherein the softproofing rendering unit rasterizes at least one device dependent object of the input file into a grayscale image, the at least one device dependent object including any one of monochrome, grayscale, highlight color, or full color.

11. The softproofing device according to claim 10, wherein the softproofing rendering unit determines what changes were made to an original captured image by the print engine specific rendering characteristics and reverses made changes.

12. The softproofing device according to claim 9, wherein the softproofing rendering unit identifies the target print engine from a tag in the input file.

13. The softproofing device according to claim 9, wherein the input file is a raster image.

14. The softproofing device according to claim 9, wherein the input file is in a page description language format.

15. The softproofing device according to claim 14, wherein the rendering is performed on an object-by-object basis.

16. The softproofing device according to claim 9, wherein the target print engine includes any one of a monochrome printer, a highlight color printer, and a color printer.

17. A non-transitory storage medium on which is recorded a program for causing a computer to implement the method according to claim 1.

18. A softproofing system for faithfully representing an image intended to be output on a target print engine on a display, the softproofing system comprising:

a softproofing rendering means for receiving an input file representing the image intended to be printed by the target print engine and rendering the input file, including identification of the target print engine from a plurality of print engines and identification of print engine specific rendering characteristics for the identified target print engine;

a modeling means for modeling the image into a form that can be displayed on a display that takes into account the identified target print engine specific rendering characteristics; and a display means for displaying the modeled image to faithfully represent printed output from the target print engine, including the identified target print engine specific characteristics, wherein the identified target print engine specific rendering characteristics include halftone screen identification, error diffusion identification, halftone dot shape, anti-aliasing, and line width compensation.

* * * * *